United States Patent Office 2,852,195
Patented Sept. 16, 1958

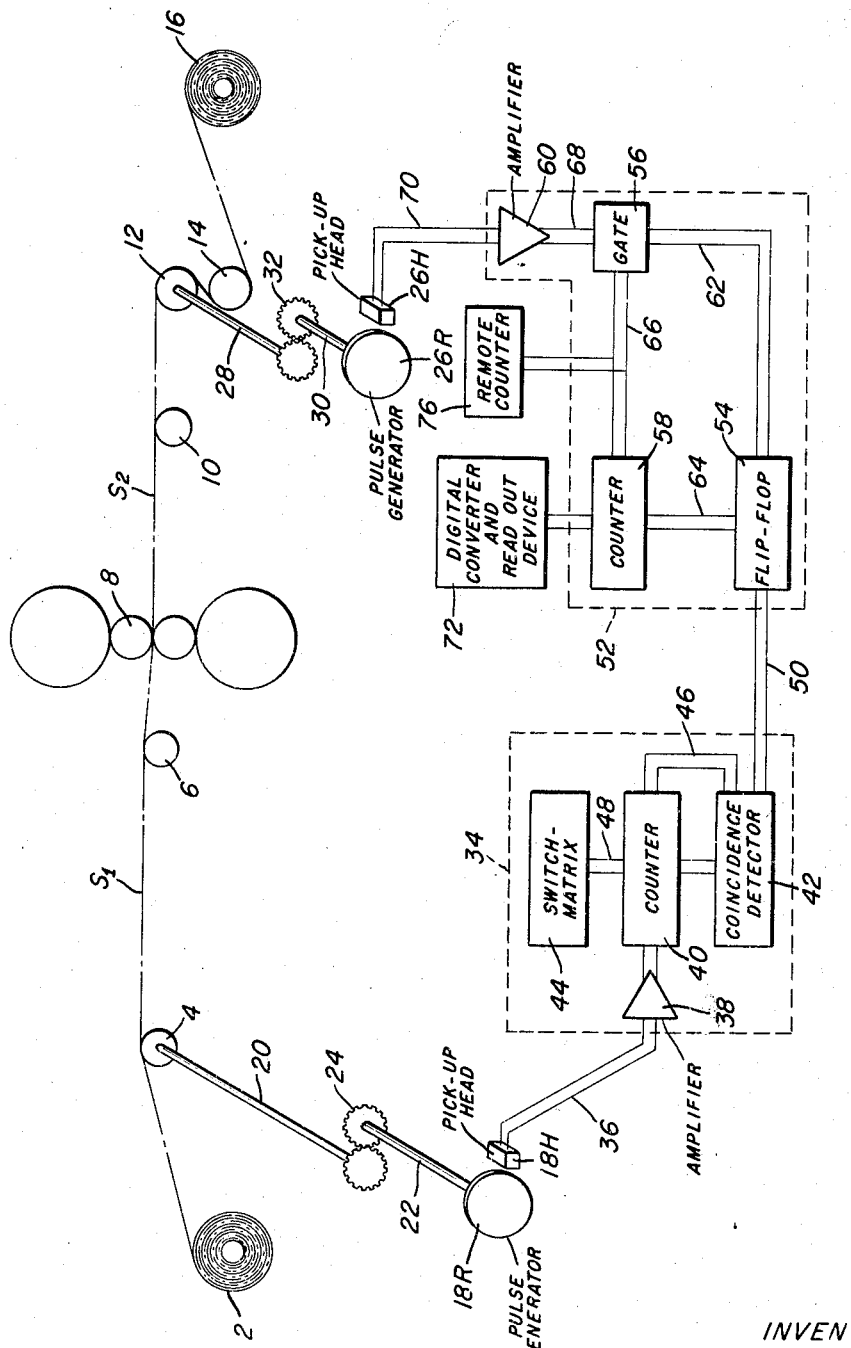

2,852,195

EXTENSOMETER

William E. Coleman, Monroeville, and James A. Milnes, Pittsburgh, Pa., assignors to United States Steel Corporation, a corporation of New Jersey Application July 1, 1955, Serial No. 519,566

2 Claims. (Cl. 235—103.5)

This invention relates to an extensometer and more particularly to an extensometer for measuring the extension of steel strip being cold rolled. Various types of extensometers have been provided for this purpose. Strain gages have been placed on the mill housing in order to measure the pressure exerted on the steel and a combination of these readings and known characteristics of the steel have been used to give an approximate reading of the extension. This method is indirect and is affected by such variables as bearing lubrication and roll deformation. Another system involves the use of a differential selsyn arrangement which measures the difference between the speed of rotation of a roll driven at exit speed and a roll driven at entry speed. The difference in speeds is directly proportional to the extension of the strip. This method is accurate, but relatively slow in response and installation and calibration of the equipment is complex. None of the extensometers of which we are aware are easily recalibrated in the event of physical changes in the mill equipment. For example, it is necessary to refinish the measuring rolls from time to time with resulting changes in the diameter of the rolls.

It is an object of our invention to provide an extensometer which is relatively simple in installation and which can readily be calibrated and recalibrated.

This and other objects will be more apparent after referring to the following specification and attached drawings, in which the single figure is a schematic view of the extensometer as connected in a rolling mill.

Referring more particularly to the drawing, reference numeral 2 indicates an uncoiler for supporting a coil of strip. Strip S1 passes from the uncoiler 2 over a billy roll 4 and crimping roll 6 and then through work rolls 8 of a rolling mill where it is reduced in thickness. The reduced strip S2 passes over a billy roll 10 and tension bridle rolls 12 and 14 to a coiler 16. The equipment so far described is conventional and it will be understood that parts thereof may be omitted or additional equipment added. Tension is maintained throughout the length of the strip from uncoiler 2 to coiler 16 so that there will be no slack loops in the strip. Billy roll 4 is connected to a standard pulse type tachometer generator 18 through shafts 20 and 22 and gearing 24. The tachometer generator 18 consists of a rotor 18R and a magnetic pick-up head 18H. The rotor 18R may have a plurality of teeth or magnets spaced about its periphery so that a plurality of electrical pulses will be generated for each revolution of the rotor. Roll 12 is similarly connected to a second pulse type tachometer generator 26 through shafts 28 and 30 and gearing 32. The generator 26 consists of a rotor 26R and magnetic pick-up head 26H. Tachometer generator 18 is connected to a pre-set counter 34 through wires 36. The pre-set counter 34 is a standard piece of equipment and may be a binary counter, a decimal counter or a ring type decimal counter. The pre-set counter 34 includes a voltage amplifier 38 connected to the wires 36, a counter section 40 connected to the output of amplifier 38, a coincidence detector 42 and a switch matrix 44. The coincidence detector 42 is connected to the counter 40 through wires 46 and switch matrix 44 is connected to counter section 40 through wires 48. The counter section 40 is standard and may be as described in the article by Slatter "Simple decimal counter using binary units" on pages 391 and 392 of the September 1952 issue of Electronic Engineering or on page 852 of "Electronic Circuits and Tubes" by Cruft Electronics Staff, published by McGraw-Hill Book Co., 1947. The switch matrix 44 permits selection of a desired number and may be of the type described on pages 153 and 429 of "Waveforms" by Chance, published by McGraw-Hill Book Co., 1949, on pages 41, 588 and 589 of "Electronic Instruments" by Greenwood, published by McGraw-Hill Book Co., 1948, or in Grosdoff Patent No. 2,519,184, dated August 15, 1950. The coincident detector determines when the number accumulated in the counter section 40 is equal to the desired number inserted in the switch matrix 44 and may be of the type described on the above identified pages of Chance or Greenwood. The coincidence detector 42 is also connected by means of wires 50 to a second counter 52. This is a standard piece of equipment. Counter 52 includes a flip-flop circuit 54, a gate 56, a counter section 58 similar to counter section 46 and a voltage amplifier 60. Flip-flop circuit 54 and gate 56 together constitute an electronic swtich. Flip-flop circuit 54 may be of any well known type and the gate may consist of a single electronic tube, both of which are described on the above identified pages of Chance or Greenwood. The flip-flop circuit 54 is connected to gate 56 by means of wires 62 and to counter section 58 by means of wires 64. Gate 56 is connected to counter section 58 by means of wires 66. Amplifier 60 is connected to gate 56 by means of wires 68. Pick-up head 26H is connected to amplifier 60 my means of wires 70. The output of counter 52 may be connected to a printing device 72 to obtain a permanent record of extension and/or to a remote indicator 76 which can be mounted near the mill operator.

The operation of the device is as follows. Assuming that the generators 18 and 26 are identical and that the size of the rolls 4 and 12 and the arrangement of the gearing 24 and 32 is such that the rotors 18R and 26R will rotate at the same speed when the strip is not being reduced, the pre-set number may be selected as 1000. This number is set in the switch matrix 44. As the strip S1 passes over the roll 4 it rotates the rotor 18R at a speed proportional to entering strip speed. This produces voltage impulses which are detected by pick-up head 18H and transmitted over wires 36 to the amplifier 38 where they are amplified and introduced into the counter section 40. Each impulse adds one count to the number appearing on the counter section 40 and when the count accumulated corresponds to the number pre-set itno the switch matrix 44, an impulse is generated in the coincidence detector 42. This impulse is transmitted back to the counter section 40 through wires 46, resetting the counter to zero. The counter section will immediately start to again accumulate the pre-set number of counts. Each time the pre-set number is accumulated the output impulse from detector 42 is also transmitted through the wires 50 to the flip-flop circuit 54. While the foregoing is taking place the rotor 26R is being rotated at a speed proportional to the speed of strip S2. This creates impulses which are picked up by pick-up head 26H and transmitted through wires 70 to the amplifier 60. The amplified impulses are transmitted to the gate 56. Flip-flop circuit 54 alternately puts out positive and negative pulses. When the first impulse from coincidence detector 42 is introduced into the flip-flop circuit 54, the flip-flop circuit 54 puts out a negative pulse which opens the gate 56 and resets counter section 58 to zero. Since the gate is open impulses from the amplifier 60 pass therethrough to the counter section 58 which records the number of impulses until the pre-set number is reached on counter 40. When this occurs the impulse from coincidence detector 42 is impressed on the flip-flop circuit 54 causing it to put out a positive pulse which closes the gate 56 but has no effect on the counter 58. The accumulated number will remain on counter 58 until the preset number again occurs on counter 40 at which time the impulse from coincidence detector 42 will be impressed on flip-flop circuit 54 causing it to put out a negative pulse which opens the gate 56 and resets the counter section 58 to zero. Thus for each alternate accumulation of the preset number on counter 40 the counter 58 will count the impulses from generator 26 and the number so determined will remain on counter 58 between alternate counts on counter 40. If the counter 58 records 1010 counts while the pre-set number 1000 is being accumulated on counter 40, it is apparent that the strip has been extended 1%. In other words the percent of extension is indicated by the second digit on the counter 58. If it is desired to have greater accuracy the pre-set number can be taken at 10,000 so that the extension will be determined to one hundredth of a percent. In most instances the relationship between the speeds of rotors 18R and 26R will not be as indicated above since the rolls 4 and 12 will vary in size. The calibration and/or recalibration of the extensometer under those conditions will be carried out as follows: The relationship between the number of pulses $C_1$, produced by pulse generator 18 during the time $x_1$ units of strip S1 pass over the billy roll 4, and the number of units $k_1$ of strip S1 passing over the billy roll 4 per pulse of generator 18 is given by the equation $$C_1 = \frac{x_1}{k_1} \qquad (1)$$

Also, the number of pulses $C_2$, produced by pulse generator 26 during the same time, is given by the equation $$C_2 = \frac{x_2}{k_2} \qquad (2)$$

where $x_2$ represents the units of strip S2 passing over tension roll 12 while $x_1$ units are passing over roll 4 and $k_2$ indicates the number of units of strip S2 passing over roll 12 per pulse from generator 26. Also $$x_2 = x_1 + ax_1 = x_1(1+a) \qquad (3)$$

where $a$ equals percent extension of the strip. Therefore, by substituting Equations 1 and 3 in Equation 2 it will be seen that $$C_2 = \frac{x_1(1+a)}{k_2} = \frac{C_1 k_1}{k_2}(1+a) \qquad (4)$$

Now if $$C_1 = 1000 \frac{k_2}{k_1}$$

it will be found by substituting in Equation 4 that $$C_2 = 1000 \frac{k_2}{k_1} \times \frac{k_1}{k_2}(1+a) = 1000(1+a) \qquad (5)$$

Therefore if counter 34 is pre-set to the number corresponding to $$1000 \frac{k_2}{k_1}$$

counter 52 will count to the number corresponding to $1000(1+a)$ during the time required for counter 34 to count to the pre-set number. Assuming that the diameters of rolls 4 and 12 are 14.049 and 23.858 inches, respectively, that the gear trains 24 and 32 have step up ratios of 52/23 and 127/33, respectively, and that the tachometer generators 18 and 26 generate 14 and 24 pulses per revolution, respectively, it will be seen that $$k_1 = \pi \frac{14.049}{14 \times 52/23}$$

or 1.394 inches of strip per pulse and that $$k_2 = \pi \frac{23.858}{24 \times 127/33}$$

or .811 inches of strip per pulse. Therefore $$C_1 = 1000 \frac{k_2}{k_1} = 581.957$$

or approximately 582.

Under these conditions the number 582 will be pre-set on the counter 34. If there is no extension it will be seen that $C_2$ equals $1000 \times (1+0)$ or 1000. If there is 1% extension counter 58 will read $1000 \times (1+.01)$ or 1010. Thus it will be seen that each 10 pulses from tachometer 26 in excess of 1000 is equivalent to an extension of 1%. Since the counter is accurate to a plus or minus one count the measured extension will be accurate to plus or minus 0.1%. If it is desired to obtain greater accuracy the counter 34 would be pre-set to 5820 so that 100 pulses from tachometer 26 would be equivalent to an extension of 1% and the accuracy would be plus or minus .01%.

While one embodiment of our invention has been shown and described it will be apparent that other adaptations and modifications may be made without departing from the scope of the following claims.

We claim:

1. An extensometer for determining the amount of extension of a strip passing through a rolling mill comprising an entry roll over which the strip passes prior to its entry into the mill, an exit roll over which the strip passes after leaving the mill, a first pulse-type tachometer generator driven by said entry roll, a second pulse-type tachometer generator driven by said exit roll, a pre-set counter connected to the output of said first tachometer generator, a second counter connected to the output of said second tachometer generator, means operable by the pre-set counter to reset the second counter to zero at the beginning of each alternate accumulation of the pre-set number on the pre-set counter, means operable by the pre-set counter to permit impulses from the second tachometer generator to pass on to the second counter during a first count-accumulation period, and means operable by the pre-set counter to prevent impulses from being transmitted from the second tachometer generator to the second counter during the next count-accumulation period.

2. An extensometer according to claim 1 including a read out device connected to said second counter.

References Cited in the file of this patent

UNITED STATES PATENTS

| | | |
|---|---|---|
| 2,039,914 | McBane | May 5, 1933 |
| 2,519,184 | Grosdoff | Aug. 15, 1950 |
| 2,332,573 | Hibschmann | Oct. 26, 1953 |
| 2,672,284 | Dickinson | Mar. 16, 1954 |
| 2,721,701 | Hardesty et al. | Oct. 25, 1955 |